United States Patent [19]

Hüttlin

[11] Patent Number: 5,305,716
[45] Date of Patent: Apr. 26, 1994

[54] ROCKING-TYPE PISTON ENGINE

[76] Inventor: Herbert Hüttlin, Daimlerstrasse 7, 7853 Steinen, Fed. Rep. of Germany

[21] Appl. No.: 969,146

[22] PCT Filed: Feb. 26, 1992

[86] PCT No.: PCT/EP92/00399
§ 371 Date: Feb. 9, 1993
§ 102(e) Date: Feb. 9, 1993

[87] PCT Pub. No.: WO93/01395
PCT Pub. Date: Jan. 21, 1993

[30] Foreign Application Priority Data

Jul. 12, 1991 [DE] Fed. Rep. of Germany ....... 4123176

[51] Int. Cl.$^5$ .............................................. F02B 53/00
[52] U.S. Cl. .................................... 123/18 R; 417/481
[58] Field of Search ........................ 123/18 R, 193.1; 417/481, 482

[56] References Cited

U.S. PATENT DOCUMENTS

| | | | |
|---|---|---|---|
| 1,983,033 | 12/1934 | Hutchison, Jr. | 418/153 |
| 3,871,337 | 3/1975 | Green et al. | 123/18 R |
| 3,923,013 | 12/1975 | Myers | 123/18 R |
| 4,392,458 | 7/1983 | Gummeringer | 123/18 R |
| 5,074,253 | 12/1991 | Dettwiler | 123/18 R |

FOREIGN PATENT DOCUMENTS

| | | |
|---|---|---|
| 0997998 | 10/1976 | Canada . |
| 1947406 | 9/1969 | Fed. Rep. of Germany . |
| 2363077 | 12/1973 | Fed. Rep. of Germany . |
| 4123176 | 7/1991 | Fed. Rep. of Germany . |
| 800753 | 7/1936 | France . |
| 509953 | 7/1939 | United Kingdom . |

Primary Examiner—Tony M. Argenbright
Assistant Examiner—M. Macy
Attorney, Agent, or Firm—Brumbaugh, Graves, Donohue & Raymond

[57] ABSTRACT

Four pistons (20) are arranged offset from one another at angular spacings of 90° in a housing (10) having a cylindrical inner wall, and they are each supported to be pivotable about a piston axis (B) which is parallel to the housing axis (A). The pistons (20) are designed as two-armed levers whose arms are in rolling engagement with a respective adjacent piston arm so that four housing chambers (18) are defined in the housing (10) by a pair each of piston arms in rolling engagement with each other. Either a fuel-air mixture or air into which fuel is injected is processed in the housing chambers (18) according to the Otto or Diesel four stroke cycle, with the pistons (20) rocking back and forth like a balance. These rocking motions are converted into rotation of a central shaft (30) by cam followers (38) which roll off running surfaces (40) formed on the pistons (20).

10 Claims, 10 Drawing Sheets ic wall portion the outer surface of which forms a sealing rolling engagement with a corresponding part cylindrical wall portion of each of the two adjacent pistons, as will be described in greater detail below.

ROCKING-TYPE PISTON ENGINE

The invention relates to a rocking-type piston engine, comprising
- a housing in which a plurality of chambers are defined all around a central housing axis between two end walls,
- a plurality of pistons, each pivotable about a piston axis in parallel with the housing axis and sealed with respect to both end walls,
- a central shaft which is rotatable about the housing axis and in driving connection with the pistons, and inlet and outlet passages for supply and discharge, respectively, of a fluid into and out of the chambers of the housing.

In a known rocking piston engine of this kind (DE 23 63 077 B2) four cylinder chambers are disposed all around the central axis of the housing; they are each defined by a circular cylindrical wall portion and two planar side wall portions converging radially outwardly in an apex. Each of the four cylinder chambers is divided into two housing chambers by a plate-like piston which is pivotably supported in the area of the apex. The total number of four pistons each are connected by a crank drive to a gear each meshing with a central gear fastened on the central shaft. In this manner the pivoting motions of the four pistons are synchronized in such a way that each of them carries out windshield wiper-like reciprocating movements during which it effects sealing with respect to the two end walls and the circular cylindrical inner wall portion.

A similar arrangement comprising only three rocker pistons is known from FR 800 753 A1.

The provision of the pistons in a rocking-type piston engine known from DE 19 47 406 A1 is inverted radially outwardly as compared to those two arrangements. In this case four pistons are supported closely adjacent one another at a central housing portion, and their radially outer edges each are movable back and forth in sealing fashion along a circular cylindrical outer housing wall portion, each of the pistons defining a housing chamber together with each of the two adjacent pistons. In contrast to the two rocking piston engines described previously, there are no partitions here between adjacent pistons.

What all three known rocking piston engines described above have in common is that good sealing between the paraxial radially outer (DE 23 63 077 B1 and FR 800 753 A1) or radially inner (DE 19 47 406 A1) sealing edges of the pistons and the corresponding circular cylindrical housing wall portions is not obtainable unless the housing is machined true to shape and size in these areas and does not become distorted under the usual loads by the influence of forces or heat. Although a compensation of forces due to inertia of the first and higher orders which occur in operation can be achieved, in principle, with the known rocking piston engines including four equal rocking pistons, this is so only by way of the crank drives which connect the pistons to the central shaft. These gear connections, however, have an inherent, unavoidable rotational elasticity so that the greatly varying forces acting on the individual pistons at any particular moment may cause vibrations of the gears and, being disturbing as such, these vibrations also may affect the mass equilibrium.

It is, therefore, the object of the invention to provide a rocking-type piston engine which is marked by improved cooperation of the individual pistons.

The object is met, in accordance with the invention, starting from a rocking-type piston engine of the kind mentioned initially, in that
- the pistons are embodied by two-armed levers whose arms each are in sealing rolling engagement with a respective adjacent piston through meshing teeth, and
- each housing chamber is defined by a pair of piston arms in rolling engagement.

The mutual sealing engagement between the piston arms greatly facilitates the seal between the pistons and the housing. Consequently sufficient sealing effect is maintained even if the housing deforms under thermal load. The forces to be transmitted for achieving complete mass equilibrium are transmitted directly between the pistons and, therefore, largely without vibrations. While the meshing pistons rock in opposite senses, air or a fuel-air mixture can be compressed in the housing chambers at any desired ratio so that the rocking piston engine according to the invention can be designed both as an Otto engine or a Diesel engine and can be operated at high thermodynamic efficiency with any desired liquid or gaseous fuels, such as hydrocarbons.

Advantageous further developments of the invention may be gathered from the subclaims.

An embodiment of the invention will be described in greater detail below, with reference to diagrammatic drawings, in which.

Figure 1:
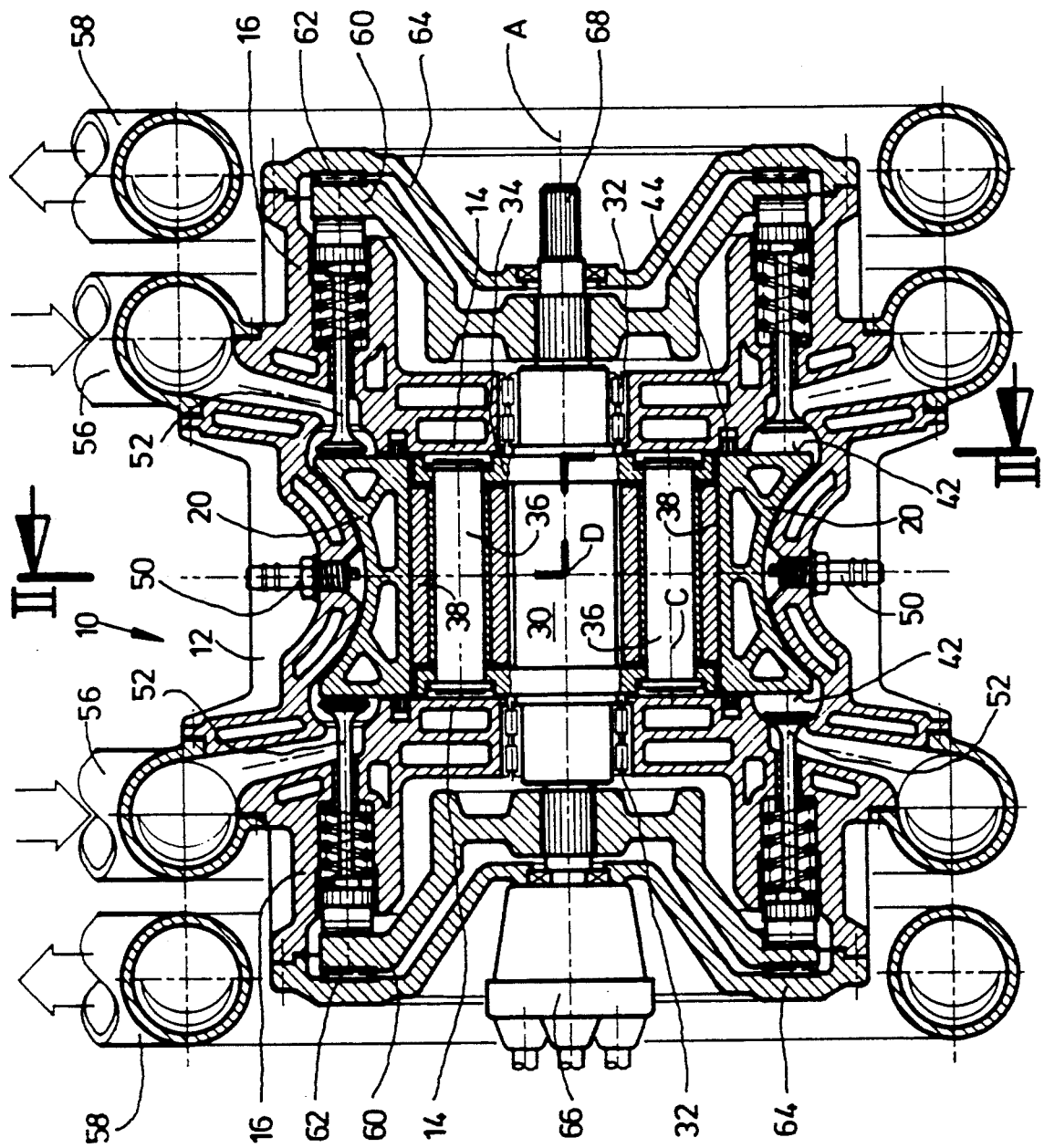
FIG. 1 shows a rocking-type piston engine, devised as a four stroke Otto engine, in longitudinal section I-I according to FIG. 2.
Figure 2:
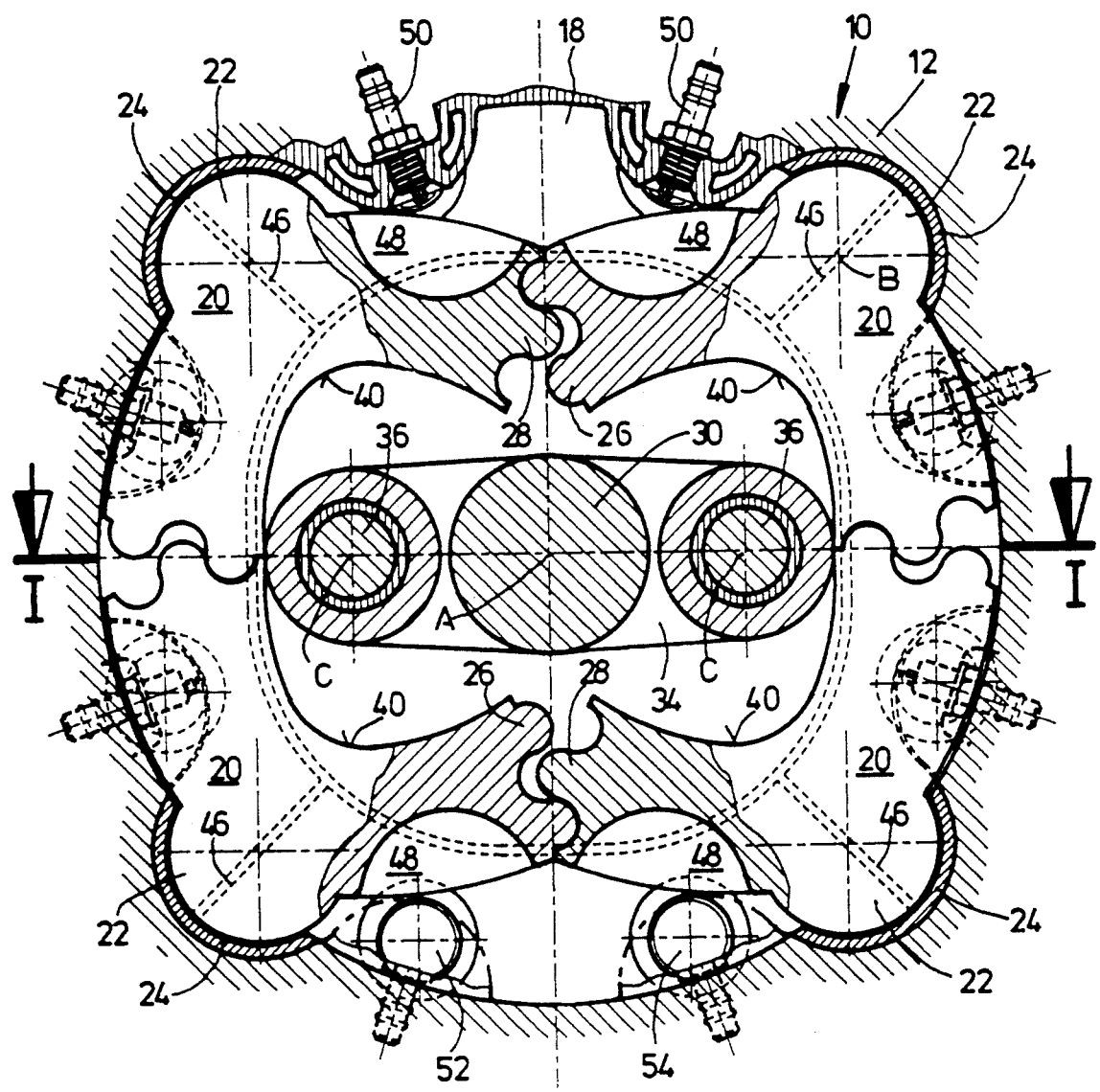
FIG. 2 is the cross section II-II according to FIG. 1.

The rocking piston engine illustrated in FIGS. 1 and 2 comprises a housing 10 with a central housing portion which forms a peripheral wall 12 and two laterally integral housing portions which each present an end wall 14 with a respective extension 16 projecting annularly outwardly. The housing 10 is substantially rotationally symmetrical with respect to a central housing axis A; the peripheral wall 12 is substantially of circular cylindrical shape radially inwardly; and the end walls 14 are substantially planar axially inwardly. Four housing chambers 18, each defined by a pair of pistons in the interior of the housing 10, are offset by 90° each with respect to one another.

The piston pairs are formed by a total of four double-armed, arcuate pistons 20, each having a part cylindrical bearing portion 22 at their radially outer side for support in a complementary bearing 24 at the inside of the peripheral wall 12. Together with the corresponding bearing 24, the bearing portion 22 of each piston 20 defines a piston axis B about which the respective piston is pivotable. In the embodiment shown, the bearing portions 22 of the pistons 20 are convex and the bearings 24 at the peripheral wall 12 thus are concave. Yet an inverse design is feasible as well.

Each of the pistons 20 is formed at the end of each of its two arms with teeth 26 and 28, respectively, engaging in complementary teeth 28 and 26, respectively, of the adjacent piston 20. By these toothings 26 and 28, the pistons 20 can roll off each other such that all the pistons can be rocked back and forth only simultaneously and by the same angle, while adjacent pistons are rocking back and forth in opposite directions, between end positions in which one arm each of each piston abuts against the peripheral wall 12.

A central shaft 30 whose geometric axis coincides with the housing axis A extends through the housing 10. The central shaft 30 is supported in a shaft bearing 32 each in the two end walls 14 and comprises two parallel transverse members 34 between the two end walls which members are intereconnected by a pair of bearing journals 36. The two bearing journals 36 are disposed eccentrically with respect to the housing axis A, their axes C extending parallel to the housing axis A, diametrically opposite each other.

A cam follower 38 in the form of a cylindrical roller is freely rotatable on each of the two bearing journals 36. The cam followers 38 are adapted to roll off running surfaces 40 at the radially inner side of the pistons 20. In cross section the running surface 40 of each individual piston 20 is shaped approximately like a parabola whose axis intersects the corresponding piston axis B and whose smallest radius of curvature is slightly greater than half the outer diameter of the cam followers 38.

The pistons 20 each have two parallel end surfaces 42 which are sealed against a respective one of the end walls 14 by an annular seal 44 each and a radial seal 46 starting from the first mentioned seal. In four regions located radially inside each of the four bearings 24, the annular seal 44 has the shape of a quarter of a circle each. These quarter circles are interconnected by a rectilinear portion each. All the seals 44 and 46 are embedded in grooves formed in the end walls 14.

An approximately semispherical combustion chamber 48 is defined at the radially outer side of each of the two arms of each piston 20. Thus two combustion chambers 48 each are associated with each of the four housing chambers 18. Two spark plugs 50 project into each of the housing chambers 18 and are directed towards the centers of the two corresponding combustion chambers 48.

Each combustion chamber 48 furthermore is connected by a pair of inlet valves 52 and a pair of outlet valves 54 to a pair of inlet passages 56 and a pair of outlet passages 58, respectively. The inlet and outlet valves 52 and 54 are disposed in one each of the end walls 14 and controlled by a pair of cam discs 60 arranged substantially radially inside one each of the annular extensions 16, fastened on the central shaft 30, and supported by an axial pressure bearing 62 each on a housing cover 64 each.

Finally, one end of the central shaft 30 is connected to an ignition distributor 66. The other shaft end 68 has a multi-groove profile for connection of an aggregate which is to be driven.

The rocking piston engine illustrated is intended to operate as a four stroke Otto engine. Let us assume the left housing chamber 18 in FIG. 2 and the two combustion chambers 48 communicating with it contained a compressed fuel-air mixture, the associated inlet and outlet valves 52 and 54 were closed, and the central shaft 30 rotated in clockwise sense. Now, when the mixture in the two left combustion chambers 48 is ignited, the mutually engaged arms of the upper and lower left pistons 20 will rock towards the inside in the direction of the housing axis A. At the same time, the two mutually engaged arms of the upper left and right pistons 20 will rock upwardly, thereby compressing the fuel-air mixture in the upper housing chamber 18 whose inlet and outlet valves 52 and 54 likewise are closed. At the same time, the mutually engaged arms of the right upper and lower pistons 20 will rock inwardly, whereby fresh mixture, possibly precompressed, will flow into the right housing chamber 18 whose inlet valves 52 are open and whose outlet valves 54 are closed. Again at the same time, the mutually engaged arms of the lower right and left pistons 20 will rock outwardly so that previously combusted mixture will be ejected from the lower housing chamber 18 whose inlet valves 52 are closed and whose outlet valves 54 are open. During this time the central shaft 30 carries out a revolution of 90° in clockwise sense.

The next ignition takes place in the upper housing chamber 18, and all the processes described are repeated in housing chambers 18 which are offset in clockwise sense by 90° with respect to the corresponding housing chambers of the preceding cycle.

Thus four complete cycles of four strokes each take place during one full revolution of the central shaft 30. During these operations the overall center of gravity of all the moving parts always remains at the same location D on the housing axis A. Consequently, a full static and dynamic equilibrium of masses is accomplished. The smooth running of the machine described above, therefore, is at least equivalent to that of a reciprocating piston in-line engine comprising six cylinders.

Figure 3:
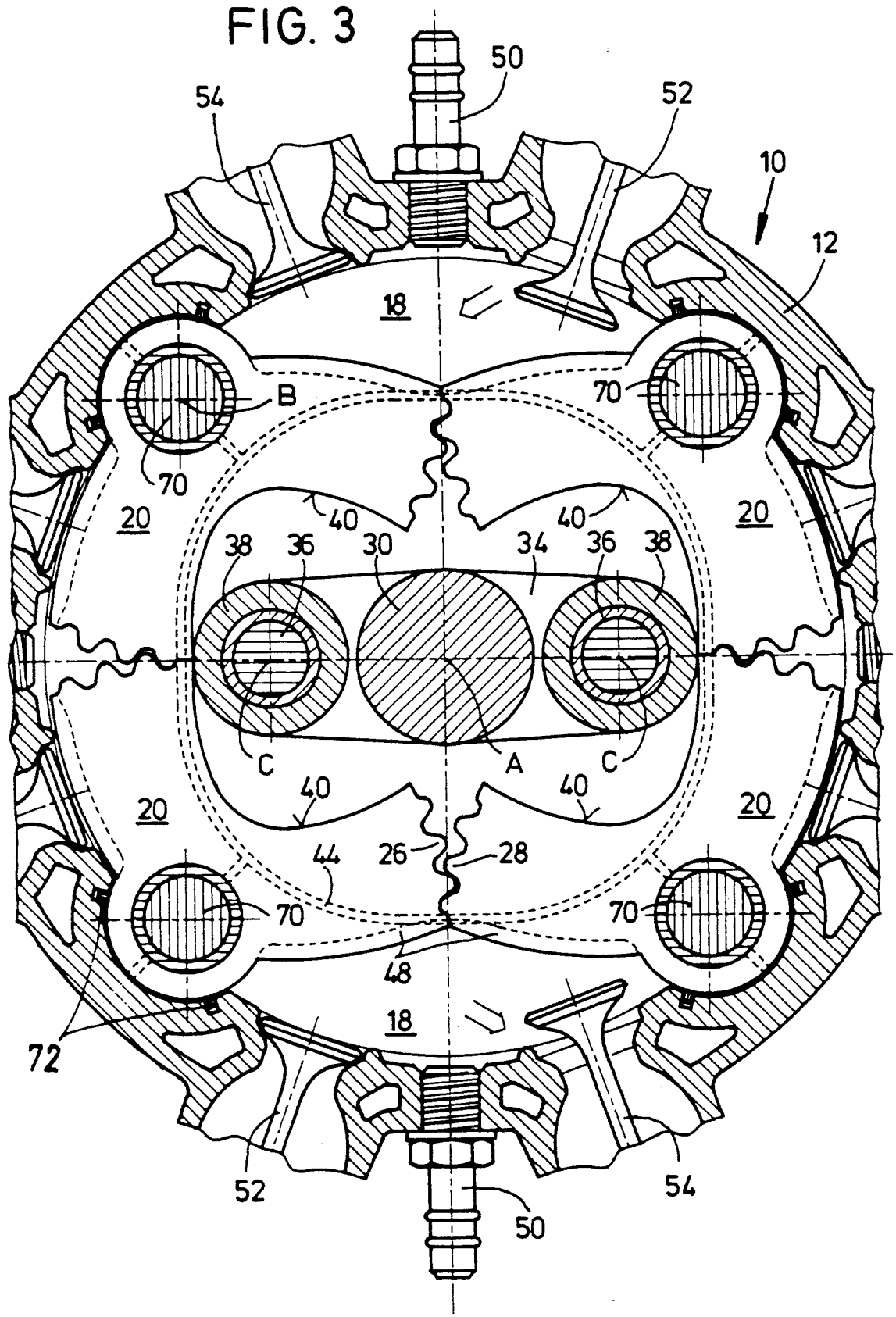
FIG. 3 is a cross section corresponding to FIG. 2 of a modified rocking-type piston engine.
Figure 4:
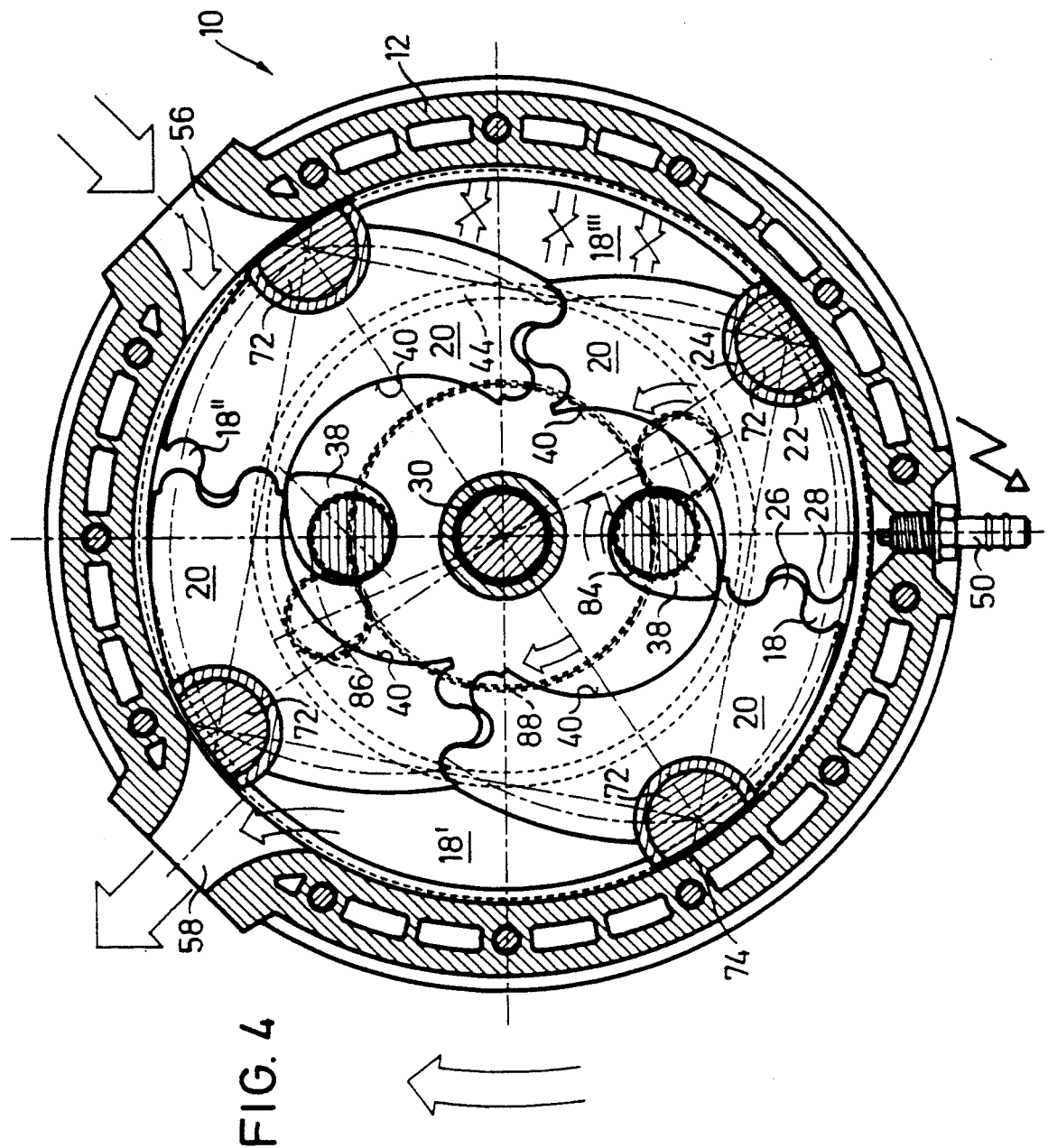
FIG. 4 shows a cross section of another rocking-type piston engine, devised as a four stroke Otto engine, at the ignition time.
Figure 5:
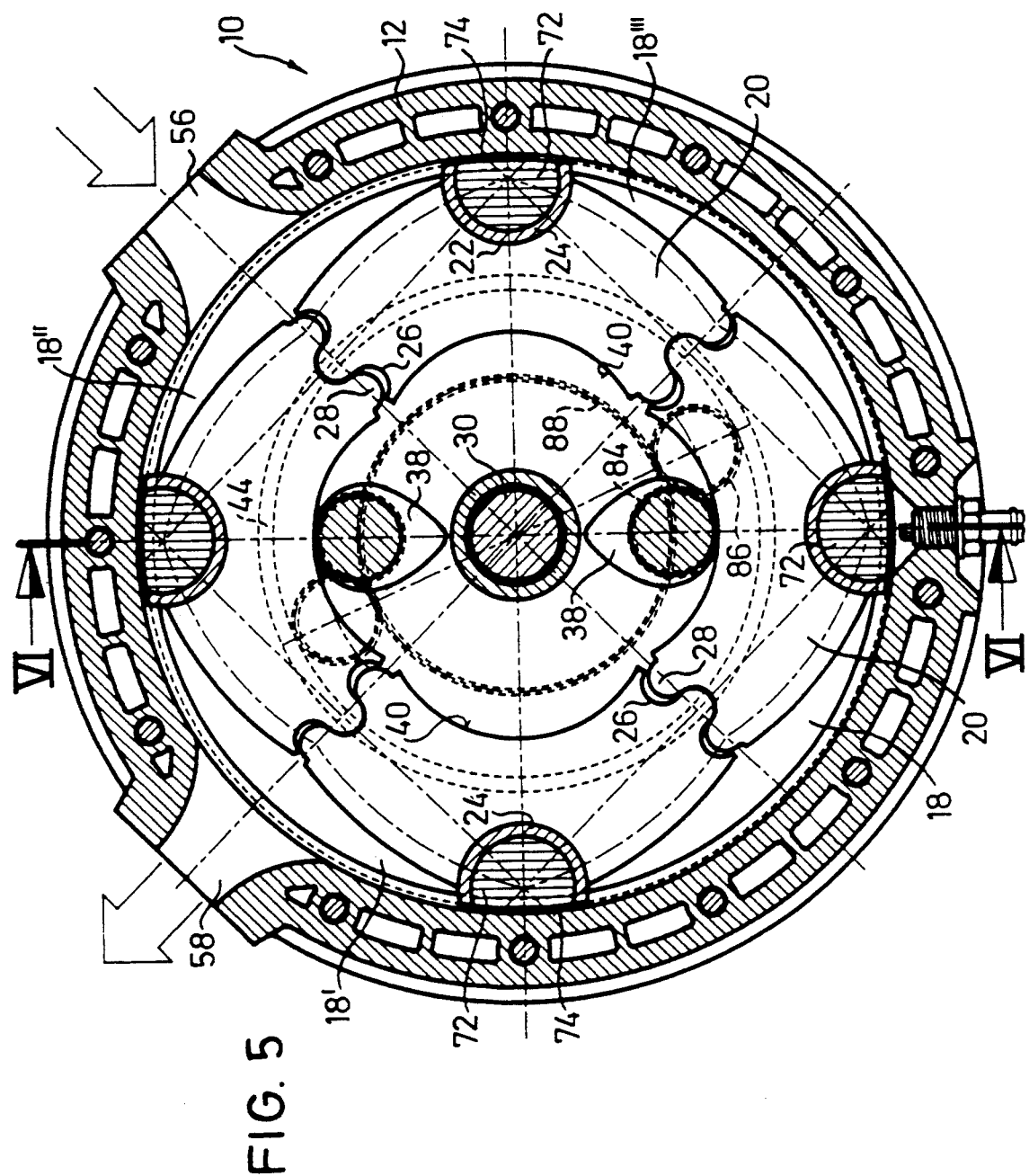
FIG. 5 shows a corresponding cross section, 30° after the ignition time.
Figure 6:
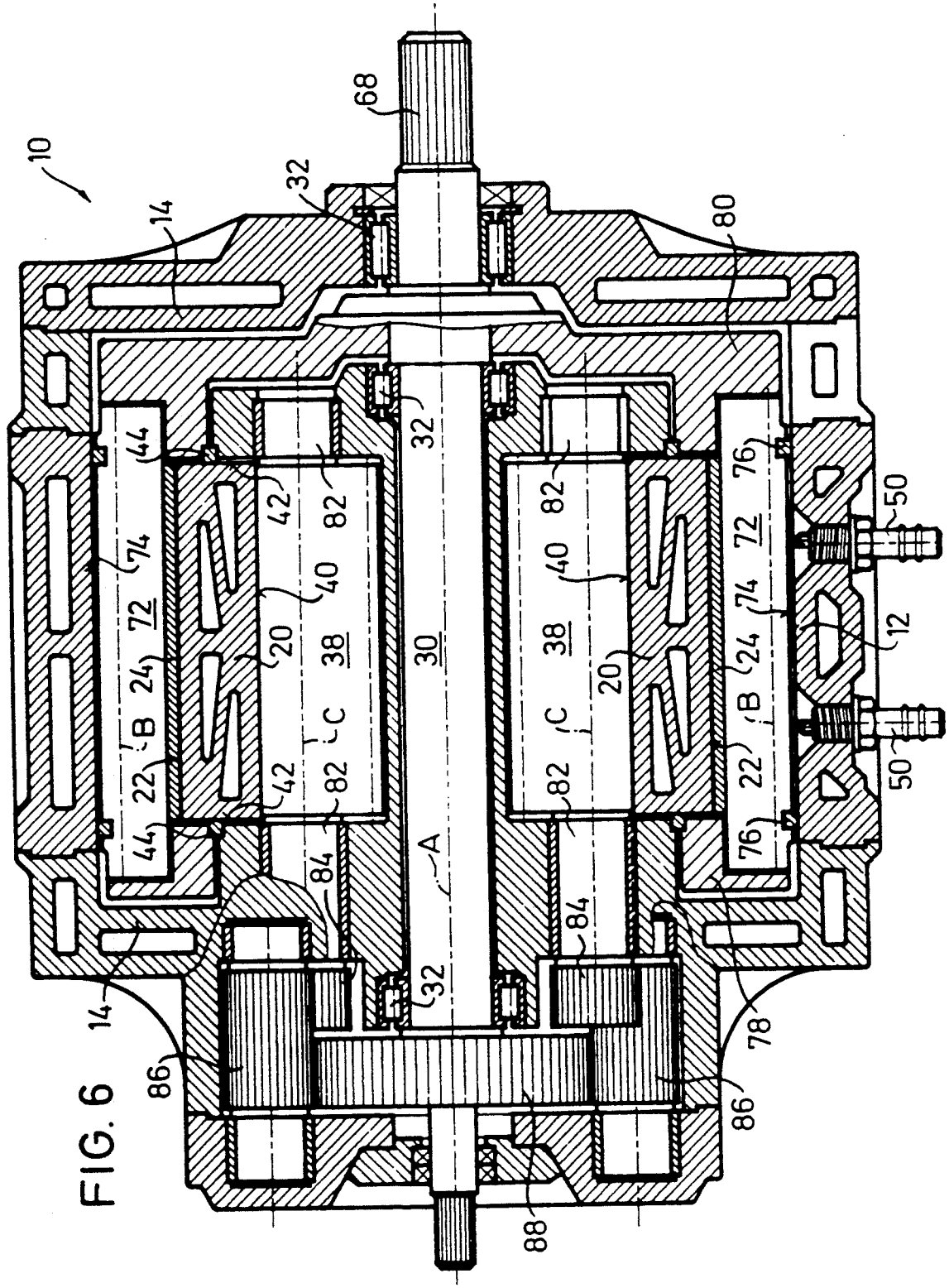
FIG. 6 is the longitudinal section VI-VI of FIG. 5
Figure 7:
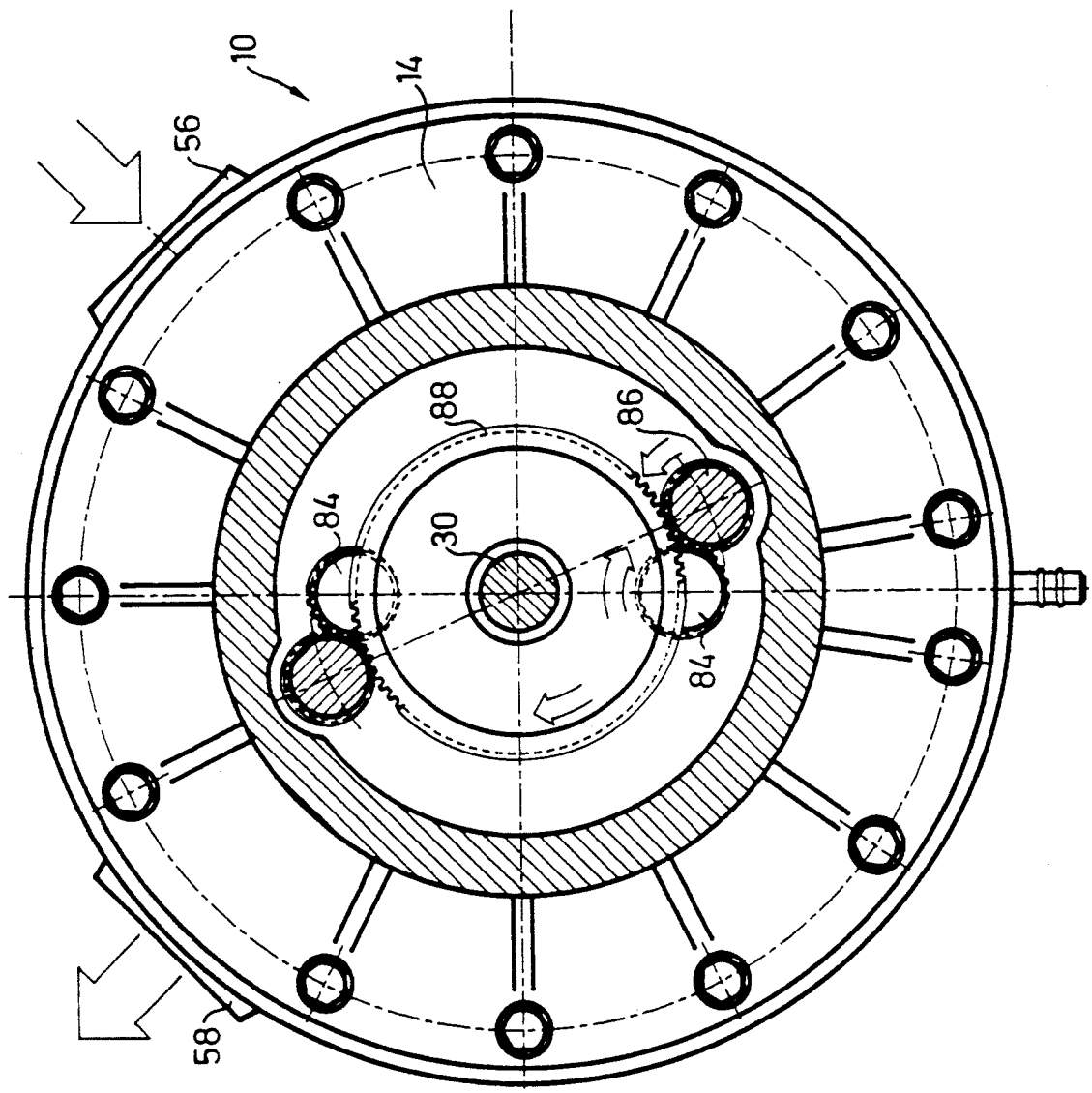
FIG. 7 is the cross section VII-VII of FIG. 6.

In the case of the embodiment shown in FIG. 3 the pistons 20 each are supported on a respective bearing journal 70 which is fastened in the two end walls 14 and has piston axis B as its geometric axis. The bearing portions 22 according to FIG. 3 are sealed with respect to the housing 10 by sealing strips 72 embedded in the housing in order to assure that the housing chambers 18 will be separated from one another also if there is a relatively large clearance between the bearing portions and the housing. With the embodiment according to FIGS. 1 and 2, on the other hand, the direct contact between the bearing portions 22 and the corresponding bearings 24 is sufficient to keep the housing chambers 18 separated.

The embodiment according to FIG. 3 further differs from the one illustrated in FIGS. 1 and 2 by the provision of only one spark plug 50 in each housing chamber 18. The inlet and outlet valves 52 and 54 are disposed radially and controlled by control shafts (not shown) which are driven in conventional manner by the central shaft 30.

The bearing journals 70 in FIG. 3 may be replaced by shafts firmly connected to one each of the pistons 20 and driving the central shaft 30 e.g. through gears and directional locking mechanisms or crank drives. In this event the transverse members 34, bearing journals 36, and cam followers 38 can be dispensed with.

The embodiments presented in FIGS. 4 to 10 differ from FIGS. 1 to 3 mainly by the following features:

The four pistons 20, again devised as double armed levers, each include a concave bearing portion 22 by which they are supported on a bearing 24 each in the form of a part cylindrical sleeve. Each of these bearings 24 is fastened on a bar 72 which extends parallel to the housing axis A and has a part cylindrical outer surface 74 by which it is adapted to slide along the peripheral wall 12 of the housing, being sealed in axial direction by means of seals 76. The bearings 24 likewise extend in sealing fashion up to the peripheral wall 12. A total of four bars 72 are provided for the four pistons 20, and they are retained at one end each by a ring 78 in offset relationship of 90° with respect to one another, while their other ends are held by a disc 80. Each bar 72 is fitted with clearance in radial outward direction, away from the housing axis A.

The disc 80 is secured to the central shaft 30. The bars 72, the ring 78, and the disc 80 form a kind of cage which rotates together with the central shaft 30. The bars 72 and the bearings 24 fixed upon them are pressed against the peripheral wall 12 of the housing by centrifugal forces, by virtue of the radial clearance mentioned, so that the four housing chambers 18 which take part in the rotation of the cage, just like the pistons 20, are reliably sealed with respect to each other.

The cam followers 38 embodied by eccentric rollers having an approximately drop-shaped outline are supported in the end walls 14 of the housing 10 by a pair of bearing journals 82 each. The running surfaces 40 with which the pistons 20 are formed each have an outline of circular arc shape, according to FIGS. 4 to 10, and the cam followers 38 can roll off the same without slipping. According to FIGS. 4 to 10 each of the cam followers 38 is connected firmly to a pinion 84 or made in one piece with the same, and each of these pinions meshes with an intermediate gear 86. Thus a total of four intermediate gears 86 are provided which mesh with the teeth of a central gear 88 fastened on the central shaft 30 and having four times as many teeth as each of the pinions 84. The transmission ratio between the central shaft 30 and each of the cam followers 38 is 1:4.

In agreement with FIGS. 1 to 3, an annular seal 44 each is disposed at the end walls 14 of the housing 10 according to FIGS. 4 to 10. This seal, however, is circular and does not seal against the the pistons 20 alone but also against the ring 78 or the disc 80.

In contrast to FIGS. 1 to 3, the embodiments shown in FIGS. 4 to 10 do not comprise a valve. According to FIGS. 4 to 9 the housing 10 includes only one inlet passage 56 and one outlet passage 58, and these passages are controlled directly by the pistons 20, in other words they are opened or blocked in accordance with the strokes. Moreover, according to FIGS. 4 to 9, there is only a single pair of spark plugs 50, and they are disposed offset with respect to the inlet passage 56 and the outlet passage 58 by from 130° to 140° each, preferably 135°. Depending on the axial length of the rocking piston engine, the two spark plugs 50 illustrated can be replaced by a single one or supplemented by one or several more spark plugs.

The mode of operation of the rocking piston engine illustrated in FIGS. 4 to 7, as a four stroke Otto engine, is shown in FIG. 8. FIG. 8A conforms to FIG. 4 and illustrates the position of the movable structural members at the ignition time. During this time, fuel-air mixture previously aspired and compressed is ignited in the lower housing chamber 18, while burnt mixture is displaced from the left housing chamber 18' through the outlet 92, fresh mixture is sucked into the upper housing chamber 18" through the inlet 90, and mixture is compressed in the right housing chamber 18'''.

Figure 8A:
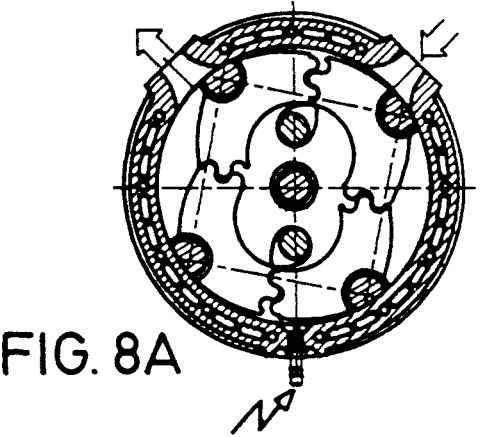
FIGS. 8A-8H show cross sections of the rocking-type piston engine illustrated in FIGS. 1 to 7 at eight points in time which succeed each other at intervals of 10°.
Figure 8H:
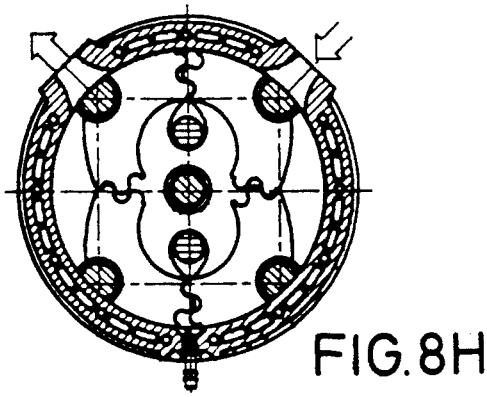
Figure 8B:
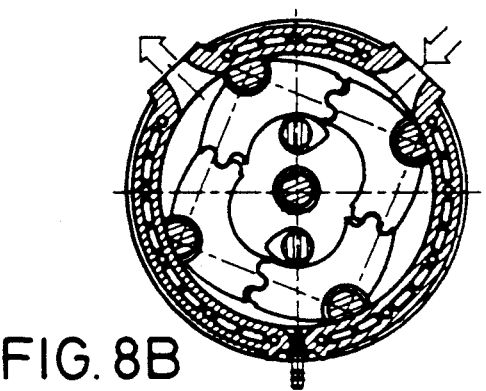
Figure 8G:
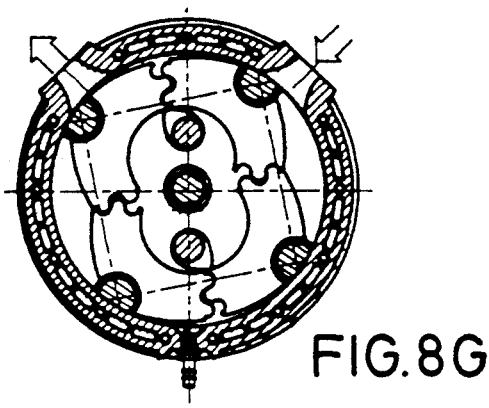
Figure 8C:
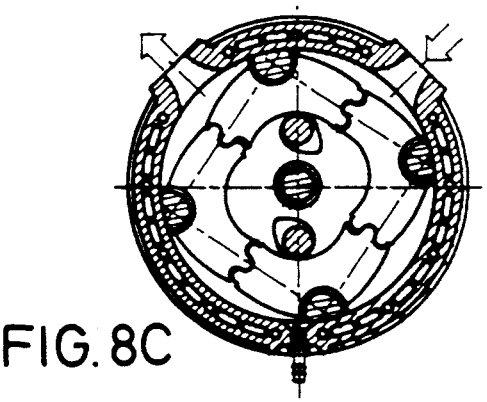
Figure 8F:
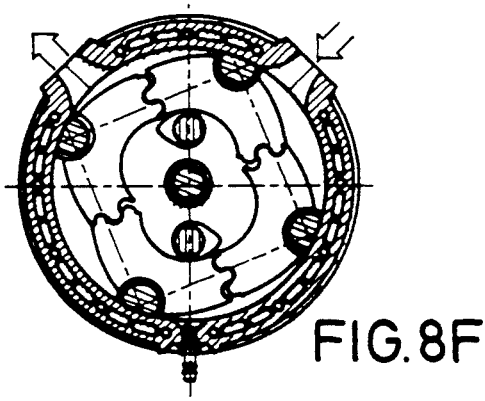
Figure 8D:
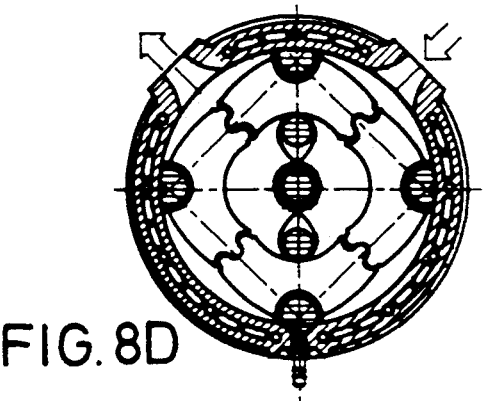
Figure 8E:
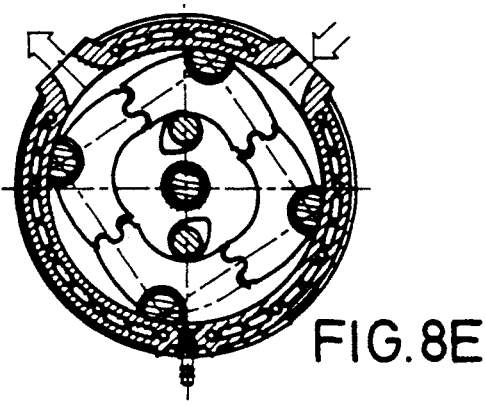

According to FIG. 8B the four pistons 20 together with the central shaft have rotated through 10° in clockwise sense, while the two cam followers 38 have rotated through 40° each, likewise in clockwise sense. In analogous manner the rotation of the central shaft 30 with the pistons 20 continues by 10° each and the rotation of the cam followers 38 by 40° each, according to FIGS. 8C to 8H, so that after one full four stroke cycle which terminates when the position according to FIG. 8A is reached, the central shaft 30 and the pistons 20 will have rotated together through 90°, while the cam followers 38 each will have carried out one full revolution of 360° about its own stationary axis C. Therefore, four complete four stroke cycles take place during one full revolution of the central shaft 30.

Figure 9:
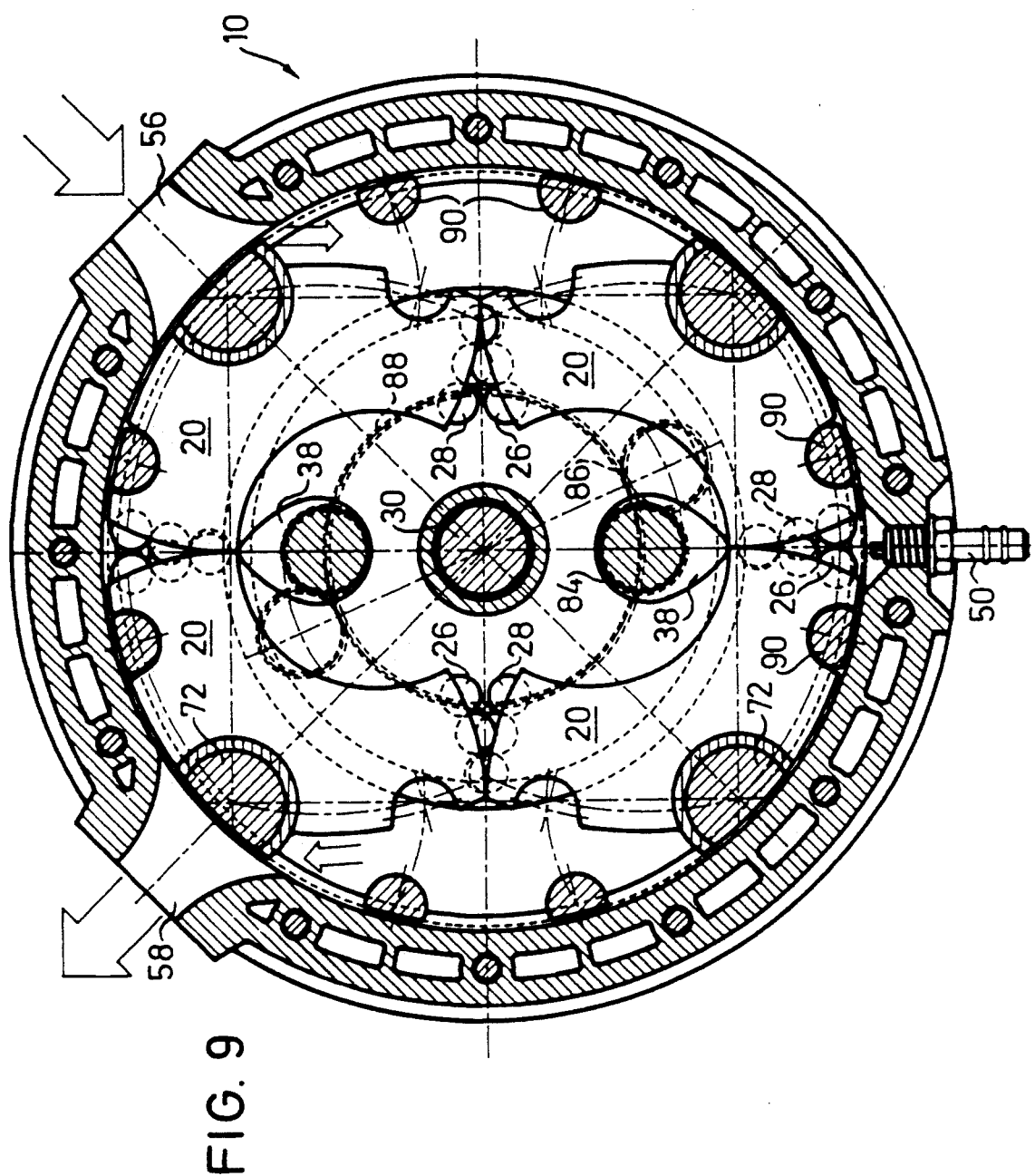
FIG. 9 is a cross section of another modified rocking-type piston engine, likewise designed as a four stroke Otto engine.

The rocking piston engine illustrated in FIG. 9 and likewise designed as a four stroke, spark ignition engine differs from the one shown in FIGS. 4 to 8 in that the ring 78 is additionally connected to the disc 80 by eight slender rods 90 against which the pistons 20 abut in their terminal rocking positions so that they cannot contact the peripheral wall 12 of the housing 10. Moreover, the teeth 26 and 28 presented in FIGS. 4 to 8 and also in FIGS. 1 to 3 as substantially cylindrical or involute toothings extending across the entire axial width of the pistons 20 are replaced, according to FIG. 9, by teeth 26 and 28 which are formed by individual semispherical projections and complementary depressions which are offset with respect to one another in axial and radial directions.

With corresponding alterations made of their conventional structural components, the rocking piston engines illustrated and described above can also be operated as fuel injection Otto or Diesel engines, as pneumatic or hydraulic engines, or as a compressor or pump.

Figure 10:
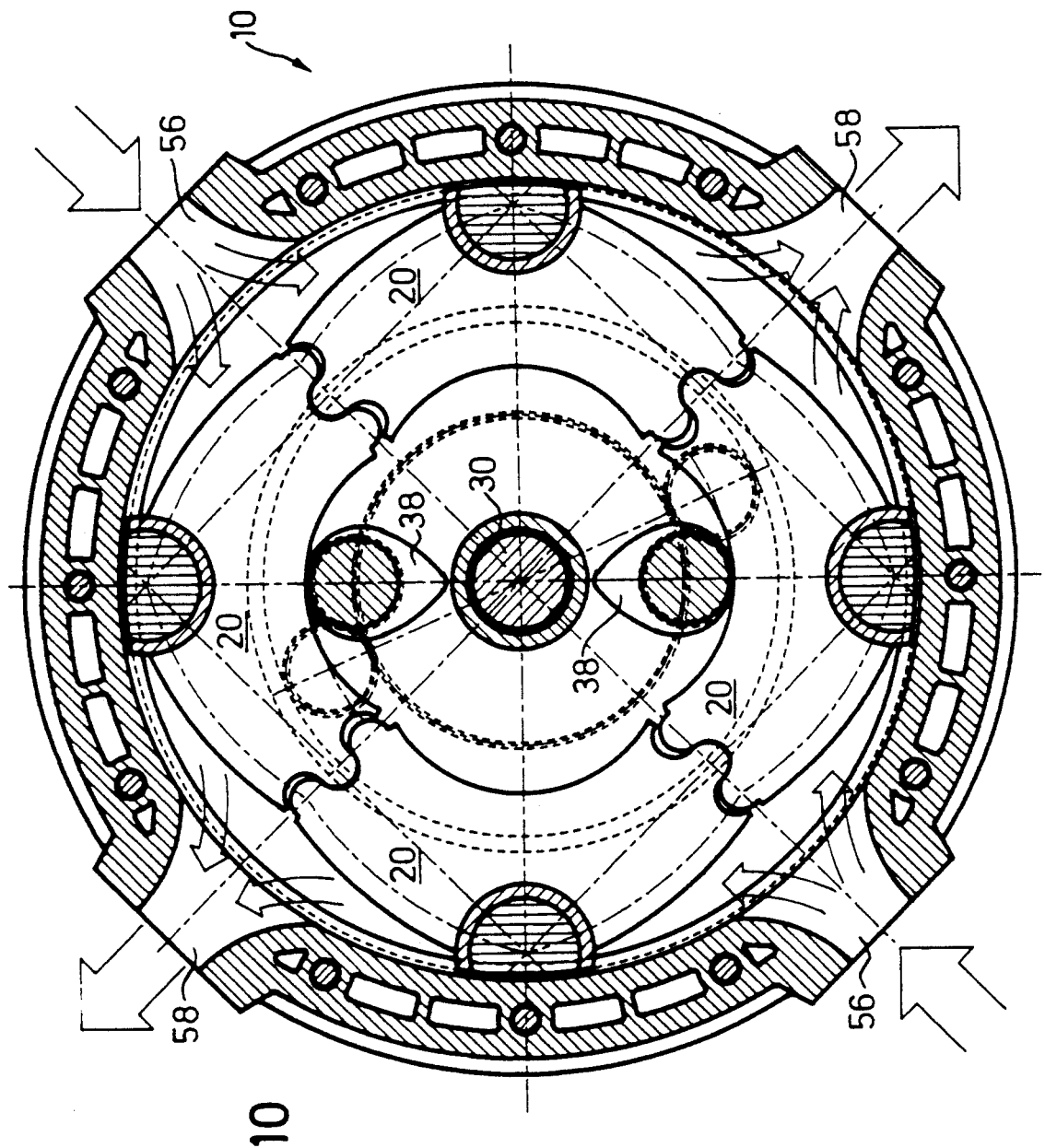
FIG. 10 is a cross section of a rocking-type piston engine designed as a pump or compressor.

In the case of the rocking piston machine shown in FIG. 10, designed as a pump or compressor, the housing 10 includes two inlet passages 56 and two outlet passages 58 in its peripheral wall 12 which are disposed at 90° spacings in such manner that each inlet passage 56 is followed by an outlet passage 58 and vice versa. With this disposition of inlet and outlet passages the rocking piston machine shown in FIG. 10 may operate also as a pneumatic or hydraulic engine.

I claim:

1. A rocking-type piston engine, comprising
a housing (10) in which a plurality of chambers (18) are defined all around a central housing axis (A) between two end walls (14),
a plurality of pistons (20), each being pivotable about a piston axis (B), which is parallel with the housing axis (A), and each being sealed with respect to both end walls (14),
a central shaft (30) which is rotatable about the housing axis (A) and in driving connection with the pistons (20), and
inlet and outlet passages (56, 58) for supply and discharge, respectively, of a fluid into and out of the chambers (18) of the housing, characterized in that
the pistons (20) are two-armed levers, each piston arm being in sealing rolling engagement with a respective adjacent piston arm through meshing teeth (26, 28), and each housing chamber (18) is defined by a pair of piston arms in rolling engagement.

2. The rocking-type piston engine as claimed in claim 1, characterized in that the pistons (20) each have a running surface (40) at the side facing the housing axis (A) along which surface an eccentric cam (38) connected to the central shaft (30) is movable such that a defined angular position of the central shaft (30) is associated with each piston position.

3. The rocking-type piston engine as claimed in claim 2, characterized in that the running surfaces (40) of adjacent pistons (20) line up with each other without any intermediate gaps at certain piston positions.

4. The rocking-type piston engine as claimed in claim 2, characterized in that two cams (38) are connected to the central shaft (30) and are disposed diametrically opposite each other with respect to the housing axis (A).

5. The rocking-type piston engine as claimed in claim 3, characterized in that two cams (38) are connected to the central shaft (30) and are disposed diametrically opposite each other with respect to the housing axis (A).

6. The rocking-type piston engine as claimed in any one of claims 1 to 4 and 5, characterized in that the pistons (20) are supported by a cage (72, 78, 80) revolving together with the central shaft (30), and the housing (10) has at least one inlet passage (56) and at least one outlet passage (58) which are controlled directly by the piston (20).

7. The rocking-type piston engine as claimed in claim 6, characterized in that two cams (38) are connected to the central shaft (30) and are disposed diametrically opposite each other with respect to the housing axis (A) and the cams (38) are eccentric rollers, each of which is rotatable about an axis (C) which is fixed with respect to the housing.

8. The rocking-type piston engine as claimed in claim 7, characterized in that the central shaft (30) is connected to each cam (38) by a gear train (84, 86, 88) having a transmission ratio of 1:4.

9. The rocking-type piston engine as claimed in any one of claims 1 to 4 and 5, characterized in that two combustion chambers (48), each formed in a respective one of the two corresponding pistons (20), are associated with each housing chamber (18).

10. The rocking-type piston engine as claimed in claim 9, characterized in that each housing chamber (18) comprises two spark plugs (50), each associated with a respective one of the two corresponding combustion chambers (48).

* * * * *